(12) United States Patent
Takesako

(10) Patent No.: US 10,466,028 B2
(45) Date of Patent: Nov. 5, 2019

(54) COORDINATE MEASURING APPARATUS

(71) Applicant: MITUTOYO CORPORATION, Kawasaki, Kanagawa (JP)

(72) Inventor: Koji Takesako, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 180 days.

(21) Appl. No.: 15/802,875

(22) Filed: Nov. 3, 2017

(65) Prior Publication Data

US 2018/0135956 A1 May 17, 2018

(30) Foreign Application Priority Data

Nov. 15, 2016 (JP) .................................. 2016-222755

(51) Int. Cl.
| | | |
|---|---|---|
| G01B 5/00 | (2006.01) | |
| B23Q 17/20 | (2006.01) | |
| G01B 3/00 | (2006.01) | |
| G01B 21/04 | (2006.01) | |
| G01B 5/008 | (2006.01) | |

(52) U.S. Cl.
CPC .......... G01B 5/0016 (2013.01); B23Q 17/20 (2013.01); G01B 3/008 (2013.01); G01B 5/0002 (2013.01); G01B 5/008 (2013.01); G01B 21/04 (2013.01); G01B 21/047 (2013.01)

(58) Field of Classification Search
CPC .... G01B 5/008; G01B 21/047; G01B 5/0009; G01B 21/042; G01B 21/04; G01B 3/008; G01B 5/0002; G01B 5/0014; G01B 5/0016; G01B 5/20

USPC .......................................................... 33/503
See application file for complete search history.

(56) References Cited

U.S. PATENT DOCUMENTS

| | | | |
|---|---|---|---|
| 2009/0084498 A1* | 4/2009 | Shimizu | G03G 15/1685 156/304.1 |
| 2011/0313706 A1 | 12/2011 | Kawamura et al. | |
| 2012/0227476 A1* | 9/2012 | Nakayama | G01B 5/016 73/105 |
| 2013/0055832 A1* | 3/2013 | Brenner | G01B 5/012 73/866.5 |
| 2017/0097220 A1* | 4/2017 | Oneta | G01B 21/047 |
| 2018/0135956 A1* | 5/2018 | Takesako | G01B 21/047 |
| 2018/0305130 A1* | 10/2018 | Kiyotani | G01B 5/0009 |

FOREIGN PATENT DOCUMENTS

JP       2012-002715       1/2012

* cited by examiner

*Primary Examiner* — Yaritza Guadalupe-McCall
(74) *Attorney, Agent, or Firm* — Rankin, Hill & Clark LLP

(57) ABSTRACT

A Coordinate measuring apparatus (100) includes a probe (102) configured to detect a workpiece and a movement mechanism (110) configured to support the probe (102) and enable the probe (102) to move in mutually-orthogonal X, Y, and Z directions. The movement mechanism (110) includes a Z-axis drive portion (141) and a spindle (162) configured to enable the Z-axis drive portion (141) to move relative to the Z direction. The Z-axis drive portion (141) includes a rotational drive mechanism (142) including a rotational drive source (148) and a drive pulley (150) to which the rotational drive source (148) provides rotation, and an open belt (164) fixed to the spindle 162 at both ends of the open belt (164) in the relative movement direction (Z direction) of the Z-axis drive portion (141) and configured to engage with an output shaft (154) of the drive pulley (150).

10 Claims, 7 Drawing Sheets

COORDINATE MEASURING APPARATUS

TECHNICAL FIELD

The present invention relates to a Coordinate measuring apparatus, and particularly relates to a Coordinate measuring apparatus that can reduce costs with a simple configuration while ensuring a suitable level of accuracy.

BACKGROUND ART

Coordinate measuring apparatuses such as that disclosed in the background art of Patent Document 1 have been used. This Coordinate measuring apparatus includes a probe that detects a workpiece, and a movement mechanism that supports the probe and enables the probe to move in mutually-orthogonal X, Y, and Z directions. This type of Coordinate measuring apparatus makes it possible to measure a workpiece with a high level of accuracy.

CITATION LIST

Patent Literature

Patent Document 1: JP 2012-2715 A

Technical Problem

However, in a Coordinate measuring apparatus such as that disclosed in Patent Document 1, the movement mechanism is large and expensive. To measure a workpiece in a manner commensurate with such a high price, it is desirable to take the measurement in a well-ordered measurement environment. In other words, the mechanism in the Coordinate measuring apparatus disclosed in Patent Document 1 is complicated and expensive, and thus may not be optimal for use in situations where a workpiece is to be measured in a simple manner while ensuring a suitable level of accuracy.

Having been conceived to solve this problem, an object of the invention is to provide a Coordinate measuring apparatus that can reduce costs with a simple configuration while ensuring a suitable level of accuracy.

Solution to Problem

To solve the above-described problems, an invention according to claim 1 of this application is a Coordinate measuring apparatus including a probe configured to detect a workpiece and a movement mechanism configured to support the probe and enable the probe to move in mutually-orthogonal X, Y, and Z directions. The movement mechanism includes a first relative movement portion and a first guide portion configured to enable the first relative movement portion to move relative to one direction. The first relative movement portion includes a rotational drive mechanism including a rotational drive source and a driving rotating member to which the rotational drive source provides rotation, and an open belt fixed to the first guide portion at both ends of the open belt in the relative movement direction of the first relative movement portion and configured to engage with an output shaft of the driving rotating member.

In an invention according to claim 2 of this application, the driving rotating member is a drive pulley connected to the rotational drive source by an endless belt.

In an invention according to claim 3 of this application, a pair of guide rails configured to enable the first relative movement portion to move in the relative movement direction are provided in the first guide portion, one of the pair of guide rails being disposed on either side of the open belt.

In an invention according to claim 4 of this application, the output shaft is arranged between the first guide portion and the open belt.

In an invention according to claim 5 of this application, the open belt is a timing belt provided with a plurality of teeth, and a tooth profile that meshes with the plurality of teeth is provided in the output shaft.

In an invention according to claim 6 of this application, the first guide portion is a spindle supporting the probe and configured to move in a Z direction, the Z direction corresponding to a vertical direction.

In an invention according to claim 7 of this application, the movement mechanism further includes a second relative movement portion fixed integrally to the first relative movement portion, and a second guide portion configured to enable the second relative movement portion to move relative to one direction orthogonal to the relative movement direction. When a position of an axial center of the rotational drive source and a position of an axial center of the driving rotating member are different in the relative movement direction, the second guide portion is arranged on a side of the driving rotating member opposite from a side on which the rotational drive source is located.

In an invention according to claim 8 of this application, the first relative movement portion includes a plurality of rollers arranged to engage with the open belt, and the open belt follows the output shaft and the first guide portion.

In an invention according to claim 9 of this application, a position of at least one of the plurality of rollers is adjustable.

In an invention according to claim 10 of this application, the movement of the first relative movement portion relative to the first guide portion can be stopped by changing positions of at least two of the plurality of rollers relative to each other to bring different parts of the open belt into contact with each other.

Advantageous Effects of Invention

According to the invention, in a Coordinate measuring apparatus, costs can be reduced with a simple configuration while ensuring a suitable level of accuracy.

BRIEF DESCRIPTION OF DRAWINGS

FIG. 4A is a partial cross-sectional view of the Z-axis drive portion, FIG. 4B is a cross-sectional view of teeth in the open belt and a facing surface of the spindle, and FIG. 4C is a cross-sectional view of the teeth in the open belt and a tooth profile in an output shaft.

FIG. 5A is a diagram illustrating a state in which the Z-axis drive portion is capable of relative movement, and FIG. 5B is a diagram illustrating a state in which the Z-axis drive portion is not capable of relative movement.

DESCRIPTION OF EMBODIMENTS

Hereinafter, embodiments of the invention will be described in detail with reference to the drawings.

A first embodiment of a Coordinate measuring apparatus according to the invention will be described with reference to FIGS. 1 to 4C.

First, the overall configuration of a Coordinate measuring apparatus 100 will be described.

Figure 1:
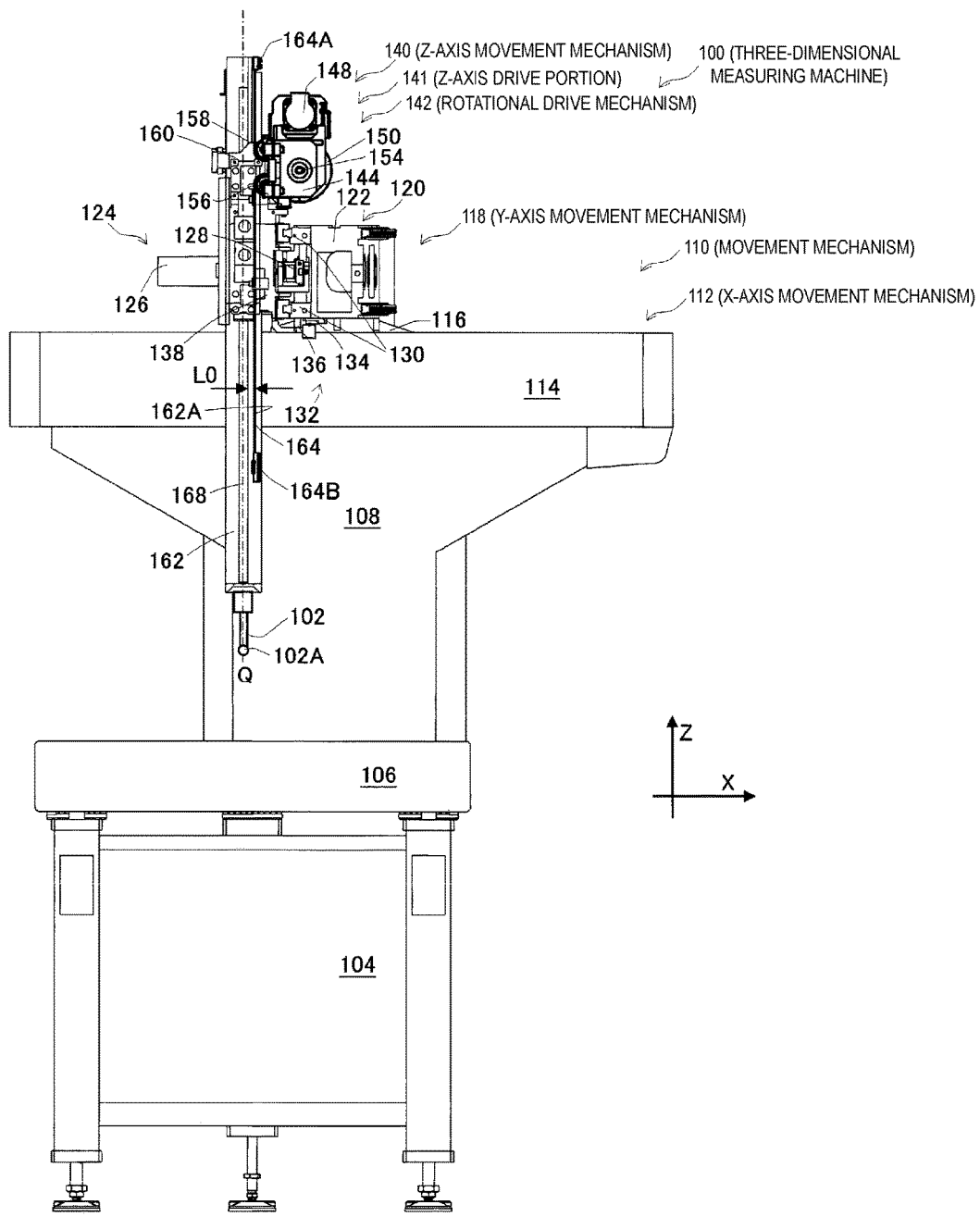
FIG. 1 is a front view illustrating an example of a Coordinate measuring apparatus according to a first embodiment of the invention.

As illustrated in FIG. 1, the Coordinate measuring apparatus 100 includes a probe 102 that detects a workpiece, and a movement mechanism 110 that supports the probe 102 and enables the probe 102 to move in mutually-orthogonal X, Y, and Z directions. The movement mechanism 110 is provided on a cantilever column 108 fixed to a base 106 mounted on a pedestal 104.

Here, the probe 102 is, for example, a touch probe having a spherical probe tip 102A (however, the probe 102 is not limited thereto, and may be a profiling probe, a non-contact probe, or the like). The probe 102 is attached to a lower end part of a spindle 162, with the probe tip 102A located on a center axis Q of the spindle 162.

Meanwhile, the pedestal 104 houses a power source, a control device, and the like of the Coordinate measuring apparatus 100. The base 106 is an area where a workpiece is placed, and is formed from iron or stone such as granite (black granite). As illustrated in FIG. 1, the cantilever column 108 is substantially T-shaped, and is fixed to one end of the base 106. Also, as illustrated in FIG. 1, an upper end part of the cantilever column 108 is longer than one side of the base 106, and a lower end part of the cantilever column 108 is shorter than the one side of the base 106. This makes it easy to insert and remove workpieces to and from the base 106. Furthermore, a workpiece can be measured even if that workpiece is large enough to protrude over the edges of the base 106. The cantilever column 108 supports the movement mechanism 110, which can measure a workpiece having substantially the same size as the base 106 using the probe 102.

The movement mechanism 110 will be described in more detail next.

As illustrated in FIG. 1, the movement mechanism 110 includes an X-axis movement mechanism 112, a Y-axis movement mechanism 118, and a Z-axis movement mechanism 140.

Figure 2:
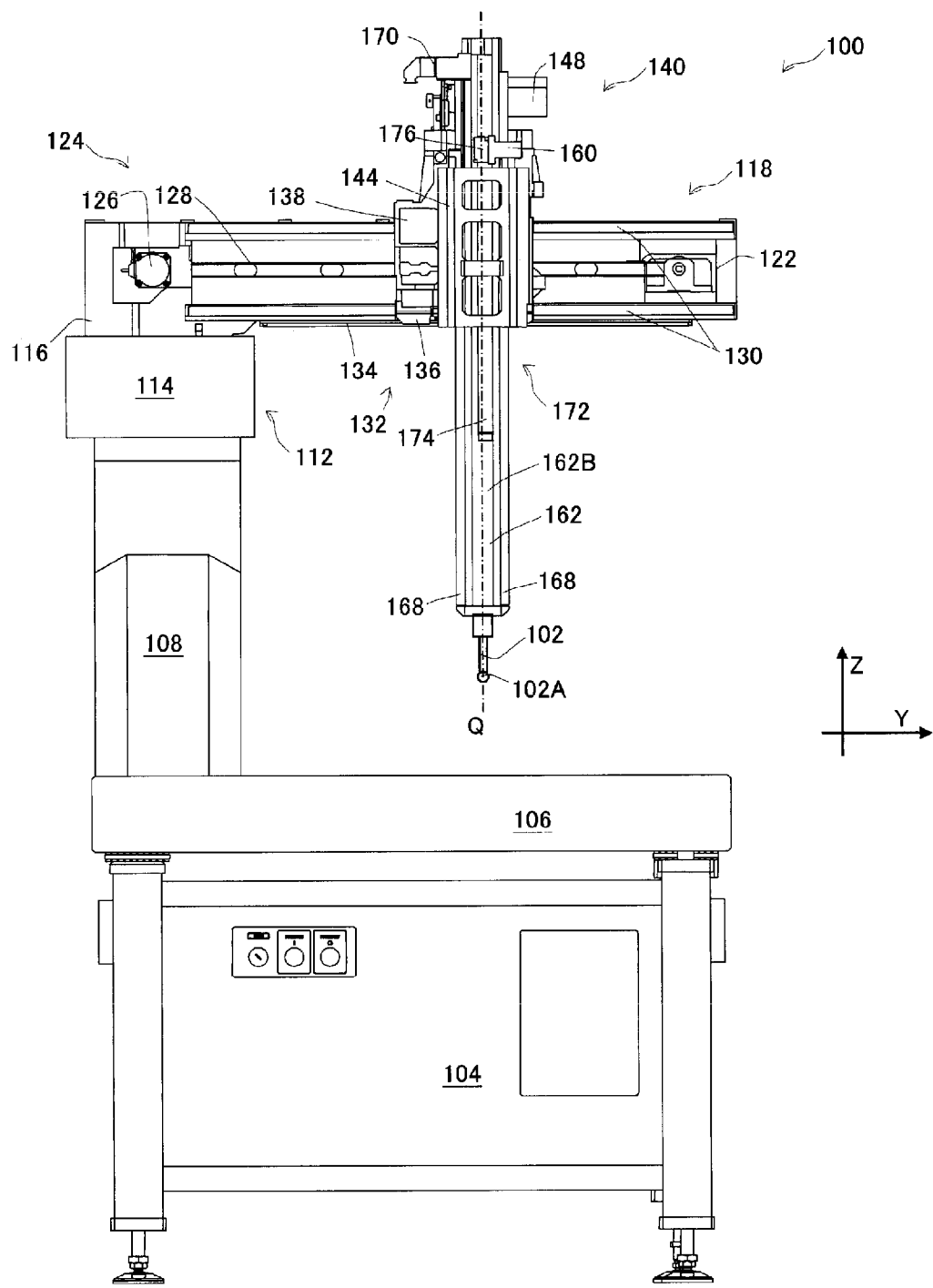
FIG. 2 is a side view of the Coordinate measuring apparatus illustrated in FIG. 1.

As illustrated in FIGS. 1 and 2, the X-axis movement mechanism 112 includes an X-axis guide portion 114 supported by the upper end part of the cantilever column 108, and an X-axis slider 116 that can move in the X direction with the X-axis guide portion 114. The X-axis guide portion 114 includes, for example, a pair of guide rails, an endless belt, a rotational drive source, and a linear encoder, these being not illustrated. The X-axis slider 116 is, for example, fixed to the endless belt and arranged on the pair of guide rails. The linear encoder is arranged along one of the guide rails. The rotational drive source is, for example, a motor equipped with a rotary encoder and a brake (and may include a transmission mechanism). The configuration is such that, for example, the motor is controlled according to an output from the rotary encoder, and the actual position of the X-axis slider 116 is measured by the rotary encoder (the rotational drive sources and linear encoders described below have the same configuration). The X-axis slider 116 integrally supports the Y-axis movement mechanism 118. The endless belt may be a timing belt in which a plurality of teeth are provided, or may be a belt in which no teeth are provided (the endless belts described below have the same configuration).

As illustrated in FIGS. 1 and 2, the Y-axis movement mechanism 118 includes a Y-axis guide portion (second guide portion) 120 fixed to the X-axis slider 116, and a Y-axis slider (a second relative movement portion) 138 capable of relative movement in the Y direction (one direction) along the Y-axis guide portion 120. The Y-axis guide portion 120 includes a shaft portion 122, a Y-axis drive portion 124, and a pair of guide rails 130. As illustrated in FIGS. 1 and 2, the shaft portion 122 supports the pair of guide rails 130. The Y-axis drive portion 124 includes a rotational drive source 126 and an endless belt 128, and is integrated with the shaft portion 122. In the embodiment, the direction corresponding to the rotation axis of the endless belt 128 is the X direction, and the endless belt 128 is interposed between the pair of guide rails 130, which are located above and below the endless belt 128. Thus, the configuration is such that the endless belt 128 is arranged on a plane formed by the pair of guide rails 130. The Y-axis slider 138 is, for example, fixed to an upper side (or a lower side) of the endless belt 128, and is arranged on the guide rails 130. A linear encoder 132 is arranged along one of the guide rails 130. In other words, a scale 134 of the linear encoder 132 is arranged on a side surface (a bottom surface in the Z direction) of the shaft portion 122, and a detector 136 of the linear encoder 132 is supported by the Y-axis slider 138. The Y-axis slider 138 integrally supports the Z-axis movement mechanism 140.

As illustrated in FIGS. 1 and 2, the Z-axis movement mechanism 140 includes a Z-axis drive portion (first relative movement portion) 141 fixed to the Y-axis slider 138, and a spindle (first guide portion) 162 that enables relative movement of the Z-axis drive portion 141 in the Z direction (one direction) (in other words, the movement mechanism 110 further includes the Y-axis slider 138 fixed integrally with the Z-axis drive portion 141, and the Y-axis guide portion 120 that enables relative movement of the Y-axis slider 138 in one direction orthogonal to the relative movement direction of the Z-axis drive portion 141 (the Z direction)).

Figure 4A:
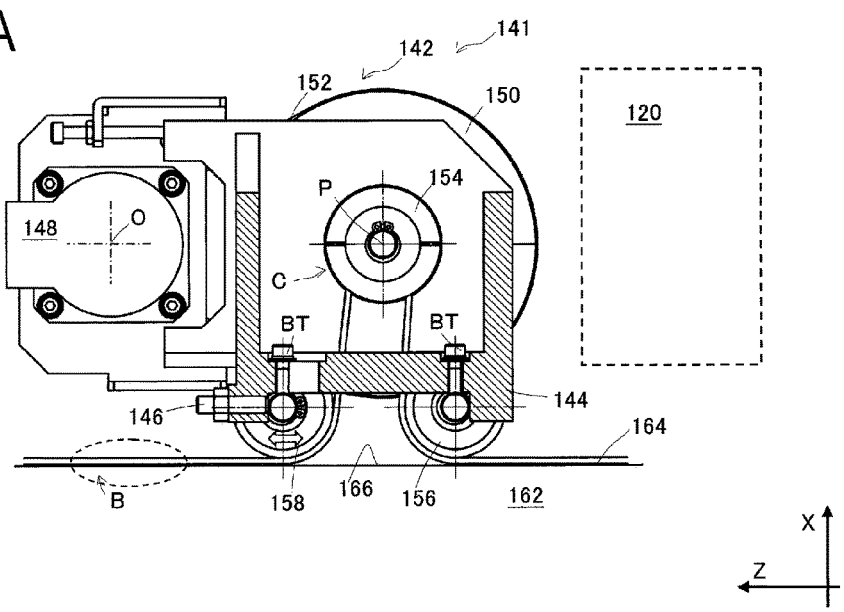
FIGS. 4A to 4C are diagrams illustrating the vicinity of a Z-axis drive portion in the Coordinate measuring apparatus, where

As illustrated in FIGS. 1 and 4A, the Z-axis drive portion 141 includes a rotational drive mechanism 142 and an open belt 164. The rotational drive mechanism 142 includes a rotational drive source 148, and a drive pulley (driving rotating member) 150 to which the rotational drive source 148 provides rotation. Here, as illustrated in FIG. 4A, the position of an axial center O of the rotational drive source 148 and the position of an axial center P of the drive pulley 150 are different with respect to the Z direction. At this time, in the embodiment, the Y-axis guide portion 120 is arranged on a side of the drive pulley 150 opposite from a side where the rotational drive source is arranged, as illustrated in FIGS. 1 and 4A. The rotational drive source 148 and the drive pulley 150 are attached to a frame portion 144 fixed to the Y-axis slider 138. The drive pulley 150 is connected to the rotational drive source 148 by an endless belt 152.

Figure 4B:
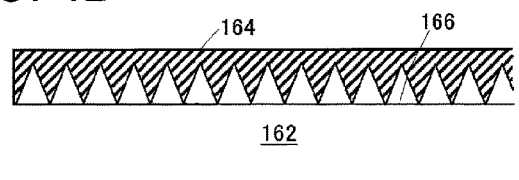
Figure 4C:
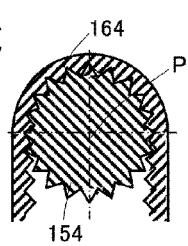

As illustrated in FIG. 4A, an output shaft 154 that engages with the open belt 164 is provided at the axial center P of the drive pulley 150. In the embodiment, the open belt 164 is arranged higher than the output shaft 154 in the X direction, as illustrated in FIG. 4C. In other words, the configuration is such that the output shaft 154 is arranged between the spindle 162 and the open belt 164, as illustrated in FIG. 4A. Note that the open belt 164 is made from fiber-reinforced rubber, for example, with both ends thereof in the relative movement direction of the Z-axis drive portion 141 (the Z direction) being fixed to a recess portion 162A in the spindle 162 by belt locking portions 164A and 164B. As illustrated in FIGS. 4B and 4C, the open belt 164 is a timing belt in which a plurality of teeth are provided, and a tooth profile with which the plurality of teeth in the timing belt mesh is provided in the output shaft 154.

Figure 3:
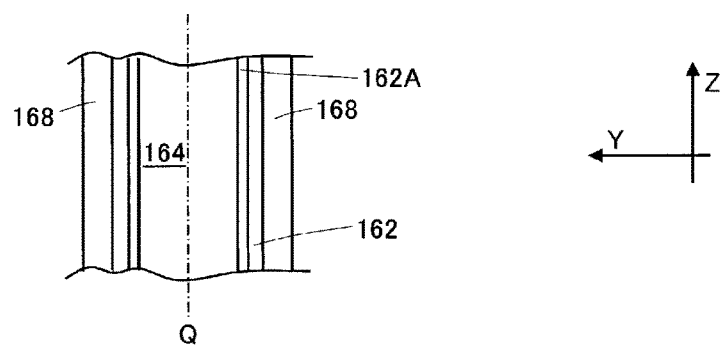
FIG. 3 is a diagram illustrating a positional relationship between guide rails arranged on a spindle and an open belt in the Coordinate measuring apparatus illustrated in FIG. 1.

As illustrated in FIGS. 1 and 2, the spindle 162 moves in the Z direction, which corresponds to the vertical direction, and supports the probe 102 on a lower end part thereof. The spindle 162 is formed from aluminum, for example, with a hollow structure, and has the minimum rigidity necessary for stably supporting the probe 102. As illustrated in FIG. 2, a pair of guide rails 168 are provided in the center area of both side surfaces of the spindle 162 when the open belt 164 is viewed in front view from the side where the Z-axis drive portion is located (that is, in the X direction). In other words, the configuration is such that the pair of guide rails 168, which enable the Z-axis drive portion 141 to move in the Z direction, are disposed in the spindle 162 on either side of the open belt 164. Furthermore, the configuration is such that the open belt 164 is arranged in the center between the pair of guide rails 168, as illustrated in FIG. 3. Because the open belt 164 is arranged in the recess portion 162A of the spindle 162, a distance L0 from the guide rails 168 to the open belt 164 is made shorter, as illustrated in FIG. 1.

As illustrated in FIG. 4A, a pair of rollers (also called "idlers" or "tensioners") 156 and 158 are arranged closer to the facing surface side of the spindle 162 than the axial center P of the drive pulley 150 with respect to the X direction. At the same time, the pair of rollers 156 and 158 are arranged on the frame portion 144 in a rotatable manner, on either side of the output shaft 154 with respect to the Z direction in a symmetrical manner. The heights of the pair of rollers 156 and 158 are adjusted by bolts BT. The pair of rollers 156 and 158 push the open belt 164 coming downward in the X direction against a facing surface 166 of the spindle 162. At the same time, the pair of rollers 156 and 158 bring the open belt 164 into contact with the outer circumference of the output shaft 154 across a longer distance. In other words, the Z-axis drive portion 141 is configured including the two rollers 156 and 158 arranged to engage with the open belt 164 so that the open belt 164 conforms to the output shaft 154 and the spindle 162. Note that a screw hole is provided in a part of the frame portion 144 immediately beside the roller 158 in the Z direction. An adjustment screw 146 that enables a rotation shaft of the roller 158 to be moved in the Z direction is threaded into this screw hole. Thus, the position of the roller 158 can be adjusted by changing the extent to which the adjustment screw 146 is threaded into the screw hole.

As illustrated in FIG. 2, a linear encoder 172 is arranged in a recess portion 162B in a rear surface of the spindle 162 (the surface on the side opposite from the side where the open belt 164 is arranged). In other words, a scale 174 of the linear encoder 172 is attached to the surface of the recess portion 162B in the spindle 162, and a detector 176 of the linear encoder 172 is supported by an extended portion 160 extending from the frame portion 144. Note that reference numeral 170 indicates a stopper for preventing the spindle 162 from falling out.

Figure 7:
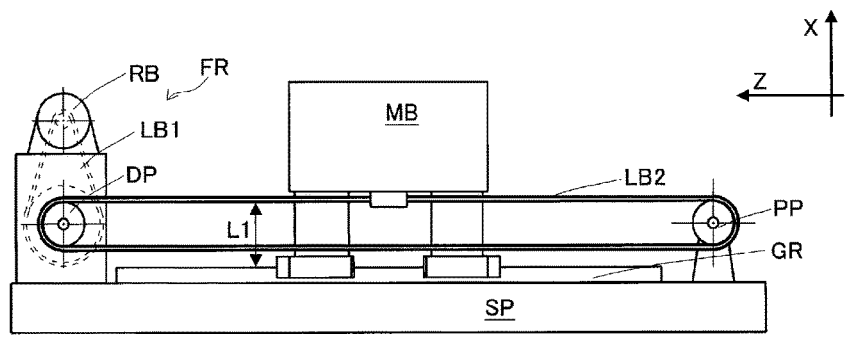
FIG. 7 is a diagram illustrating a comparative example according to the invention.

Here, a comparative example, illustrated in FIG. 7, will be described before describing the effects of the embodiment. In the comparative example, it is assumed that the Z-axis movement mechanism is realized using an endless belt instead of the open belt. Specifically, in the comparative example, a guide rail GR is arranged on a surface of a spindle SP, and a Z-axis slider MB is capable of moving thereon. Here, a Z-axis drive portion FR includes a rotational drive source RB and a drive pulley DP, and is fixed to the spindle SP. Output of the rotational drive source RB causes the drive pulley DP to rotate via an endless belt LB1. A slave pulley PP forming a pair with the drive pulley DP in FIG. 7 is provided to move the Z-axis slider MB with an endless belt LB2, and the endless belt LB2 is arranged between the Z-axis slider MB and the guide rail GR. The Z-axis slider MB is partially fixed to the endless belt LB2.

In other words, the endless belt LB2 is used in the comparative example, and thus it is necessary to ensure a space for accommodating the endless belt LB2. For this reason, the configuration is such that a distance L1 between the guide rail GR and an upper part of the endless belt LB2 (in the X direction) is unavoidably lengthened (a structure that requires an offset). In other words, in the comparative example, it is difficult to lower the center of gravity of the Z-axis slider MB. Thus, according to the comparative example, it is difficult to make the Z-axis movement mechanism compact, move the mechanism at high speeds, prevent the Z-axis slider MB from tilting such as pitching and yawing as the slider moves, and the like.

At the same time, the slave pulley PP and a member for holding the Z-axis slider MB at the position generated by the endless belt LB2, as well as the Z-axis slider MB that is separate from the Z-axis drive portion FR, are necessary in the comparative example. Furthermore, because the endless belt LB2 is used, a tension bar for adjusting the tension of the endless belt LB2 with each stroke in accordance with the stroke of that belt is necessary. Thus, according to the comparative example, the Z-axis movement mechanism may become complicated, large, and heavy. Further still, in the comparative example, the drive pulley DP and the slave pulley PP grow further apart the longer the stroke becomes, and thus it may take extra time to adjust the tension of the endless belt LB2.

However, according to the embodiment, both ends of the open belt 164 are fixed to the surface of the spindle 162 as described above (a structure that does not require an offset). In other words, the space for accommodating the open belt 164 is small, and the distance L0 between the guide rails 168 and the open belt 164 can be made much shorter than the distance L1. Thus, in the embodiment, it is easy to lower the center of gravity of the Z-axis drive portion 141. At the same time, it is easy to make the Z-axis movement mechanism 140 compact, move the mechanism at high speeds, and prevent the Z-axis drive portion 141 from tilting such as pitching and yawing, falling over, twisting, and the like as the slider moves.

Additionally, the slave pulley PP and a member for holding the Z-axis slider MB at the position generated by the endless belt LB2, which are necessary in the comparative example, are not necessary in the embodiment. At the same time, the size and weight of the members used are reduced by moving the Z-axis drive portion 141 relative to the spindle 162. Thus, the Z-axis movement mechanism 140 can be made simpler, smaller, and lighter than that in the comparative example. As a result, in the embodiment, a resonant frequency of the Z-axis movement mechanism 140 can be increased, which makes it possible to improve the response speed. In other words, the controllability of the Z-axis movement mechanism 140 can be improved, making fast response possible.

Furthermore, in the embodiment, the stroke can be lengthened simply by changing the length of the spindle 162 and the open belt 164, without the need for a tension bar or the like. In other words, the stroke of the spindle 162 can be changed easily while carrying over the same configuration for the Z-axis drive portion 141 as it is. At the same time, in the embodiment, it will not take extra time to adjust the open belt 164 even if the stroke is changed, and thus the embodiment is expected to greatly facilitate assembling.

A rack-and-pinion combination, for example, is conceivable instead of the open belt 164. However, it is necessary to form the rack and pinion parts from iron. Here, forming the spindle from aluminum will result in a combination of iron and aluminum, which limits the operation temperature range determined by the measurement precision. However, in the embodiment, the spindle 162 is formed from aluminum, with a hollow structure and the open belt 164 is formed from fiber-reinforced rubber, thus, the length thereof can be adjusted easily. Thus, in the embodiment, the operation temperature range determined by the measurement precision can be broadened as compared to a case where a combination of a rack and pinion is used. At the same time, the spindle 162 moving in the Z direction can be made lighter.

Additionally, in the embodiment, the driving rotating member is the drive pulley 150, which is connected to the rotational drive source 148 by the endless belt 152. Thus, the rotational drive mechanism 142 can be made lighter and smaller, and the cost thereof can be reduced as well. Note that the rotational drive mechanism is not limited thereto, and the rotational drive mechanism may be a combination of a transmission and a rotational drive source.

In the embodiment, the pair of guide rails 168, which enable the Z-axis drive portion 141 to move in the Z direction, are disposed in the spindle 162 on either side of the open belt 164. Additionally, the open belt 164 is arranged in the center between the pair of guide rails 168. Furthermore, the pair of guide rails 168 are also provided in the center of the side surfaces of the spindle 162. The spindle 162 can therefore be prevented from tilting even without making a slide portion that makes direct contact with the pair of guide rails 168 highly precise, and the spindle 162 can be moved up and down via the open belt 164 with a suitable level of positional reproducibility. However, the configuration is not limited thereto, and the open belt need not be arranged in the center between the pair of guide rails. Alternatively, the pair of guide rails may be provided in a position offset from the center of the side surfaces of the spindle. In such a situation as well, using a more precise member for the slide portion makes it possible to prevent the spindle from tilting and enable the spindle to be moved up and down via the open belt with a suitable level of positional reproducibility. Of course, a single guide rail may be provided instead of a pair.

In the embodiment, the output shaft 154 is arranged between the spindle 162 and the open belt 164. Thus, even if an unexpected outside force is applied, situations in which the output shaft 154 separates from the open belt 164 can be reduced. However, the configuration is not limited thereto, and the configuration may be such that the output shaft engages with the open belt on the outside of the open belt.

In the embodiment, the open belt 164 is a timing belt in which a plurality of teeth are provided, and a tooth profile with which the plurality of teeth in the timing belt mesh is provided in the output shaft 154. The open belt 164 can therefore be prevented from slipping on the output shaft 154, which makes it possible to accurately position the spindle 162. However, the configuration is not limited thereto, and a tooth profile may also be provided in the surface of the spindle facing the open belt. The spindle 162 can be positioned more accurately in this case. The open belt may instead be a belt that includes no tooth profile whatsoever.

In the embodiment, the configuration of the open belt 164 is applied in the spindle 162 of the Z-axis movement mechanism 140, and the spindle 162 supports the probe 102. In other words, because the Z-axis movement mechanism 140 is made smaller and lighter and can furthermore respond faster, the X-axis movement mechanism 112 and the Y-axis movement mechanism 118 supporting the Z-axis movement mechanism 140 can be made smaller and lighter. At the same time, by making the X-axis movement mechanism 112 and the Y-axis movement mechanism 118 able to respond faster, the movement mechanism 110 as a whole can be made smaller and lighter and can furthermore respond faster. The precision of the positional control of the probe 102 can be improved as a result. However, the configuration is not limited thereto, and the configuration may be such that the Z-axis drive portion supports the probe when the configuration of the open belt is applied to the spindle of the Z-axis movement mechanism. Alternatively, the configuration of the open belt may be applied in the X-axis movement mechanism or the Y-axis movement mechanism. In such a case, the configuration of the open belt need not be applied in the Z-axis movement mechanism.

Although the configuration of the endless belt is applied in the X-axis movement mechanism 112 and the Y-axis movement mechanism 118 in the embodiment, the configuration is not limited thereto, and a ball screw configuration may be applied in both the X-axis movement mechanism 112 and the Y-axis movement mechanism 118.

In the embodiment, the movement mechanism 110 further includes the Y-axis slider 138 fixed integrally with the Z-axis drive portion 141, and the Y-axis guide portion 120 that enables relative movement of the Y-axis slider 138 in the Y direction. The position of the axial center O of the rotational drive source 148 and the position of the axial center P of the drive pulley 150 are different with respect to the Z direction. At this time, the Y-axis guide portion 120 is arranged on the side of the drive pulley 150 opposite from the side where the rotational drive source is arranged. In other words, the rotational drive source 148, which is a source of heat, is arranged on the side of the drive pulley 150 opposite from the side where the Y-axis guide portion 120 is arranged. Effects of heat on the Y-axis guide portion 120 can thus be reduced, which makes it possible to prevent a drop in the movement accuracy of the Y-axis movement mechanism 118. Furthermore, as illustrated in FIG. 1, the rotational drive source 148 is arranged highest in the Z direction in the Z-axis drive portion 141, making it easy for heat from the rotational drive source 148 to dissipate and reducing the effects of heat from the rotational drive source 148 on other members. However, the configuration is not limited thereto, and the rotational drive source may be on the same side of the drive pulley as the Y-axis guide portion. Of course, the rotational drive source may be arranged lower than the Y-axis guide portion.

In the embodiment, the Z-axis drive portion 141 includes the pair of (two) rollers 156 and 158 arranged to engage with the open belt 164 so that the open belt 164 conforms to the output shaft 154 and the spindle 162. The length across which the open belt 164 engages with the output shaft 154 can thus be increased, and the open belt 164 can therefore be prevented from slipping on the output shaft 154. Friction between the open belt 164 and the output shaft 154 can also be reduced, which makes it possible to increase the lifespan of those members. At the same time, the Z-axis drive portion 141 can be brought as close as possible to the spindle 162, which makes it possible to more stably lower the position of the center of gravity of the Z-axis drive portion 141. In other words, the spindle 162 can be more accurately positioned relative to the Z-axis drive portion 141. However, the configuration is not limited thereto, and the rollers may be omitted, or only one roller may be provided. Or there may be three or more rollers.

Additionally, according to the embodiment, the position of the roller 158 can be adjusted using the adjustment screw 146. The tension of the open belt 164 can therefore be adjusted, and thus when a fluctuation in temperature arises, for example, the tension can be adjusted in response to that temperature fluctuation. For example, the spindle 162 expands at high temperatures, and thus the tension of the open belt 164 can be reduced; conversely, the spindle 162 contracts at low temperatures, and thus the tension of the open belt 164 can be increased. A temperature sensor may be provided to automate such adjustment operations. However, the configuration is not limited thereto, and may be such that the positions of the two rollers can be adjusted relative to each other. The tension of the open belt is adjusted so as to be able to cover the operation temperature range upon being shipped from the factory, and thus the roller positions need not be made adjustable at all.

Thus, with the Coordinate measuring apparatus 100 according to the embodiment, the same configuration can be used for the Z-axis drive portion 141 even when different strokes are to be used, and thus manufacturing costs can be reduced with a simple configuration while ensuring a suitable level of accuracy. Specifically, this configuration facilitates the assembly, making the Coordinate measuring apparatus 100 more general and less expensive. Furthermore, the Coordinate measuring apparatus 100 can be used in locations having a wide range of temperature environments, such as factories, where temperatures are not carefully managed. In other words, according to the embodiment, a workpiece can be measured in a simple manner while ensuring low costs and a suitable level of measurement precision.

Note that in the embodiment, a balance weight for achieving balance with the spindle 162 is not included. The Z-axis movement mechanism 140 can therefore be made simpler and smaller. Of course, a configuration including a balance weight may be employed for the Z-axis movement mechanism.

While the foregoing has described an embodiment of the invention, the invention is not intended to be limited to the above-described embodiment. It goes without saying that improvements and design changes may be made without departing from the essential spirit of the invention.

For example, although the first embodiment describes a configuration in which the two rollers 156 and 158 are used and only the position of the roller 158 is adjustable, the invention is not limited thereto. For example, the configuration according to a second embodiment, illustrated in FIGS. 5A and 5B, may be employed. The second embodiment differs from the first embodiment primarily in terms of the number and functions of the rollers, and thus descriptions of configurations aside from the output shaft, the rollers, and the open belt will be omitted.

In the second embodiment, by changing the positions of four rollers 256, 257, 258, and 259 relative to each other, different parts of an open belt 264 are brought into contact with each other, which makes it possible to stop the Z-axis drive portion from moving relative to a spindle 262.

Figure 5A:
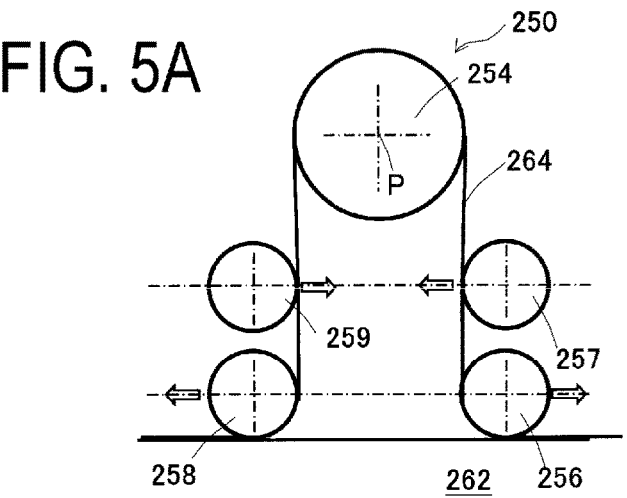
FIGS. 5A and 5B are diagrams illustrating the vicinity of Z-axis drive portions in a Coordinate measuring apparatus according to a second embodiment of the invention, where
Figure 5B:
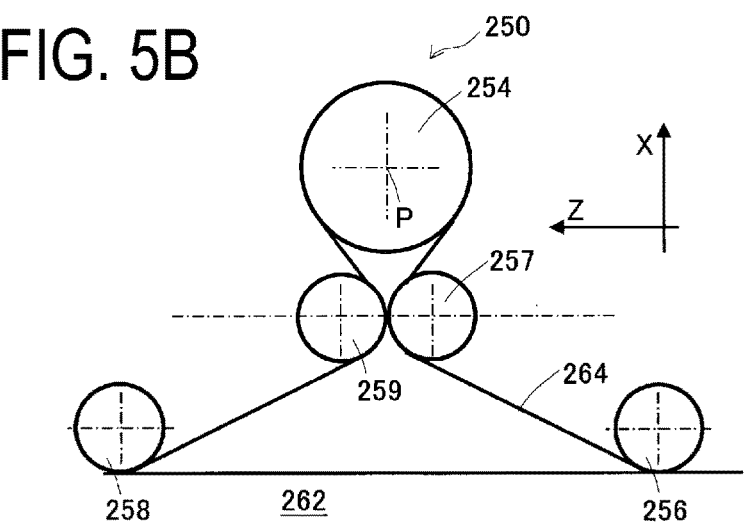

Specifically, the two rollers 256 and 258 correspond to the two rollers 156 and 158 of the first embodiment, respectively. In other words, as illustrated in FIGS. 5A and 5B, the two rollers 256 and 258 are arranged closer to a facing surface side of the spindle 262 than the axial center P of a drive pulley 250 with respect to the X direction. At the same time, the two rollers 256 and 258 are arranged on a frame portion (not illustrated) in a rotatable manner, on either side of an output shaft 254 with respect to the Z direction in a symmetrical manner. However, as indicated by the white arrows in FIG. 5A, the two rollers 256 and 258 can move by the same distance in the Z direction so as to separate from each other.

Meanwhile, as illustrated in FIGS. 5A and 5B, the two rollers 257 and 259 are arranged at the same positions, with respect to the X direction, between the axial center P of the drive pulley 250 and the two rollers 256 and 258. At the same time, the two rollers 257 and 259 are arranged on the frame portion (not illustrated) in a rotatable manner, on either side of the output shaft 254 with respect to the Z direction in a symmetrical manner. However, as indicated by the white arrows in FIG. 5A, the two rollers 257 and 259 can move by the same distance in the Z direction so as to approach each other. The movement of the four rollers 256, 257, 258, and 259 can be synchronized easily by using a cam mechanism or the like (not illustrated).

First, in the case where the Z-axis drive portion is made movable relative to the spindle 262, the rollers 256 and 258 are closest to each other in the Z direction and the rollers 257 and 259 are furthest away from each other in the Z direction, as illustrated in FIG. 5A. As a result, the rollers 256 and 257 and the rollers 258 and 259 are arranged in substantially the same positions with respect to the Z direction. Note that the distance between the rollers 257 and 259 is slightly narrower than the distance between the rollers 256 and 258, and all of the rollers 256, 257, 258, and 259 engage with the open belt 264. Next, in the case where the Z-axis drive portion is to be stopped from moving relative to the spindle 262, the rollers 257 and 259 are moved toward each other in the Z direction until two different parts of the open belt 264 on the inner sides of the rollers 257 and 259 make contact with each other, as illustrated in FIG. 5B. At the same time, the rollers 256 and 258 are separated from each other in the Z direction so that the tension on the two different parts of the open belt 264 on the inner sides of the rollers 256 and 258 changes from the state illustrated in FIG. 5A only within a permissible range (an elastic deformation range of the open belt 264). A stop button for stopping the Z-axis drive portion from moving relative to the spindle 262 may be provided, and this series of operations may be carried out automatically when the stop button is pressed.

In the second embodiment, the movement of the Z-axis drive portion relative to the spindle 262 is stopped by the movement of the four rollers 256, 257, 258, and 259, and thus the power consumption occurring when the stopped state is maintained under the power of the rotational drive source may be reduced. Furthermore, a mechanism for braking in the rotational drive source can be simplified, and thus a reduction in size and cost of the rotational drive source can be expected. However, the configuration is not limited thereto, and the movement of the Z-axis drive portion relative to the spindle 262 may be stopped by changing only the positions of the rollers 258 and 259 (or the rollers 256 and 257) without changing the positions of the rollers 256 and 257 (or the rollers 258 and 259).

Figure 6:
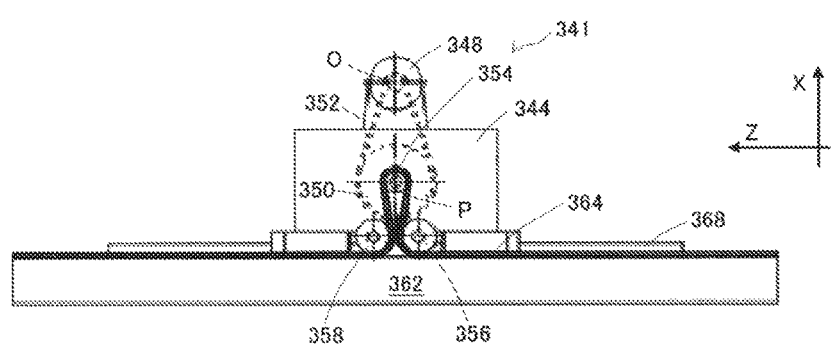
FIG. 6 is a diagram illustrating the vicinity of a Z-axis drive portion in a Coordinate measuring apparatus according to a third embodiment of the invention.

In the first embodiment, the guide rails 168 are provided on side surfaces of the spindle 162, and the rotational drive source 148 is arranged so as to follow the spindle 162. However, the invention is not limited thereto. For example, the configuration according to a third embodiment, illustrated in FIG. 6, may be employed. The third embodiment differs from the first embodiment primarily in terms of the positions of the guide rails and the position of the rotational drive source, and thus the reference numerals of configurations aside from the guide rails and the rotational drive source will be given the same final two digits, and descriptions thereof will be omitted.

In the third embodiment, an open belt 364 and a guide rail 368 are arranged on a surface of a spindle 362 when a Z-axis drive portion 341 is viewed from the front. In other words, there is no distance between the open belt 364 and the guide rail 368 with respect to the X direction. Additionally, the position of the axial center O of a rotational drive source 348 supported by a frame portion 344 and the position of the axial center P of a drive pulley 350 are the same with respect to the Z direction.

According to the embodiment, the open belt 364 and the guide rail 368 are located on the same plane, and thus the embodiment can be expected to make the Z-axis drive portion 341 even more common.

INDUSTRIAL APPLICABILITY

The invention can be applied broadly in Coordinate measuring apparatuses used to measure the three-dimensional shape of a workpiece.

REFERENCE SIGNS LIST

100 Coordinate measuring apparatus
102 Probe
102A Probe tip
104 Pedestal
106 Base
108 Cantilever column
110 Movement mechanism
112 X-axis movement mechanism
114 X-axis guide portion
116 X-axis slider
118 Y-axis movement mechanism
120 Y-axis guide portion
122 Shaft portion
124 Y-axis drive portion
126, 148, 348, RB Rotational drive source
128, 152, 352, LB1, LB2 Endless belt
130, 168, 368, GR Guide rail
132, 172 Linear encoder
134, 174 Scale
136, 176 Detector
138 Y-axis slider
140 Z-axis movement mechanism
141, 341, FR Z-axis drive portion
142 Rotational drive mechanism
144, 344 Frame portion
146 Adjustment screw
150, 250, 350, DP Drive pulley
154, 254, 354 Output shaft
156, 158, 256, 257, 258, 259, 356, 358 Roller
160 Extended portion
162, 262, 362, SP Spindle
162A, 162B Recess portion
164, 264, 364 Open belt
164A, 164B Belt locking portion
166 Facing surface
170 Stopper
BT Bolt
L0, L1 Distance
MB Z-axis slider
O, P Axial center
PP Slave pulley
Q Center axis

The invention claimed is:

1. A Coordinate measuring apparatus comprising:
a probe configured to detect a workpiece; and
a movement mechanism configured to support the probe and enable the probe to move in mutually-orthogonal X, Y, and Z directions,
the movement mechanism including:
a first relative movement portion; and
a first guide portion configured to enable the first relative movement portion to move relative to one direction, and
the first relative movement portion including:
a rotational drive mechanism including a rotational drive source and a driving rotating member to which the rotational drive source provides rotation; and
an open belt fixed to the first guide portion at both ends of the open belt in a relative movement direction of the first relative movement portion and configured to engage with an output shaft of the driving rotating member.

2. The Coordinate measuring apparatus according to claim 1,
wherein the driving rotating member is a drive pulley and is connected to the rotational drive source by an endless belt.

3. The Coordinate measuring apparatus according to claim 1, wherein a pair of guide rails configured to enable the first relative movement portion to move in the relative movement direction are provided in the first guide portion, one of the pair of guide rails being disposed on either side of the open belt.

4. The Coordinate measuring apparatus according to claim 1,
wherein the output shaft is arranged between the first guide portion and the open belt.

5. The Coordinate measuring apparatus according to claim 1,
wherein the open belt is a timing belt provided with a plurality of teeth, and a tooth profile that meshes with the plurality of teeth is provided in the output shaft.

6. The Coordinate measuring apparatus according to claim 1,
wherein the first guide portion is a spindle supporting the probe and configured to move in a Z direction, the Z direction corresponding to a vertical direction.

7. The Coordinate measuring apparatus according to claim 1,
wherein the movement mechanism further includes:
a second relative movement portion fixed integrally to the first relative movement portion; and
a second guide portion configured to enable the second relative movement portion to move relative to one direction orthogonal to the relative movement direction, and
when a position of an axial center of the rotational drive source and a position of an axial center of the driving rotating member are different in the relative movement direction, the second guide portion is arranged on a side of the driving rotating member opposite from a side on which the rotational drive source is located.

8. The Coordinate measuring apparatus according to claim 1,
wherein the first relative movement portion includes a plurality of rollers arranged engaging with the open belt and the open belt follows the output shaft and the first guide portion.

9. The Coordinate measuring apparatus according to claim 8,
wherein a position of at least one of the plurality of rollers is adjustable.

10. The Coordinate measuring apparatus according to claim 9,
wherein movement of the first relative movement portion relative to the first guide portion can be stopped by changing positions of at least two of the plurality of rollers relative to each other to bring different parts of the open belt into contact with each other.

\* \* \* \* \*